Aug. 19, 1930.  E. W. KOERING  1,773,586
VITREOUS TOWEL BAR
Filed Nov. 2, 1927
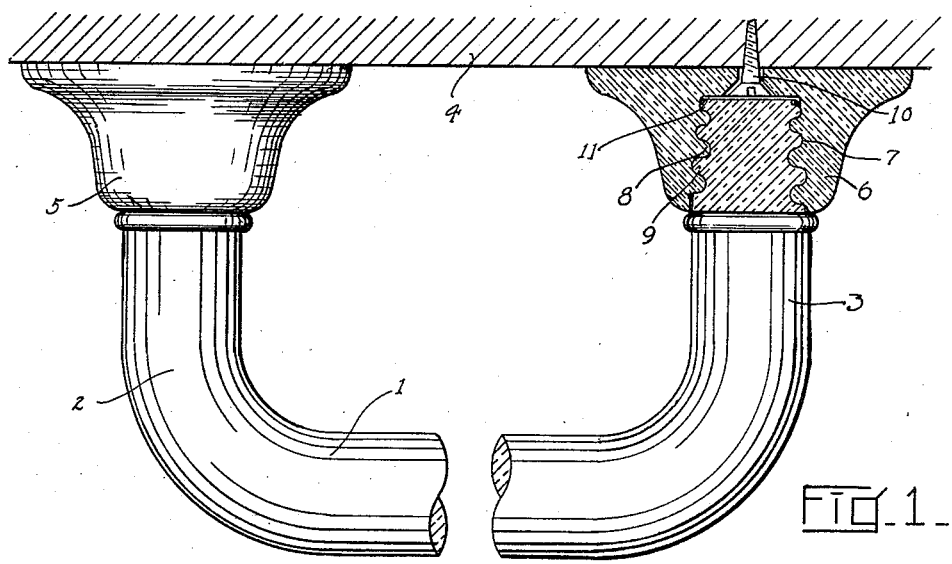
FIG. 1.
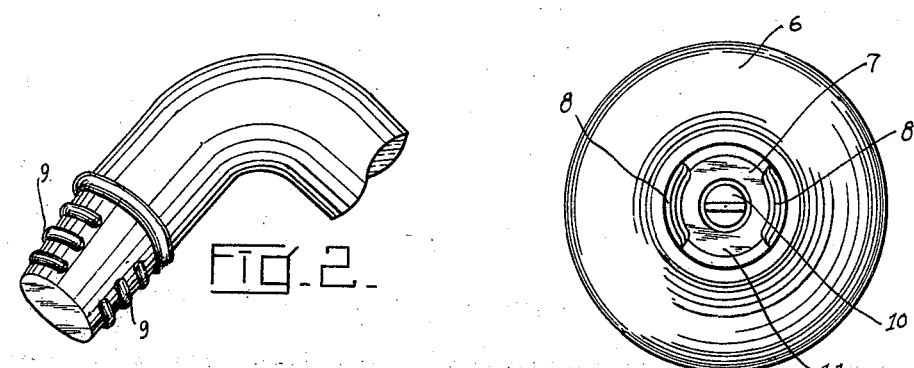
FIG. 2.
FIG. 3.
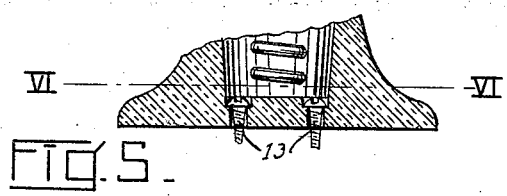
FIG. 5.
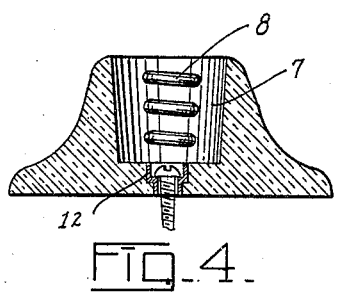
FIG. 4.
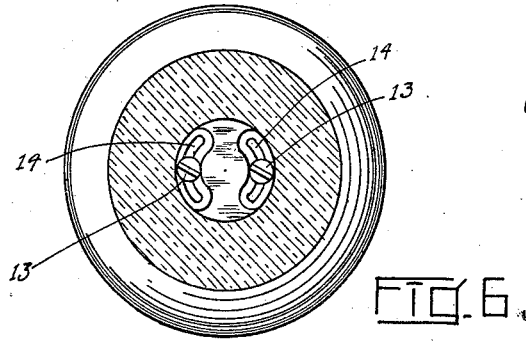
FIG. 6.
INVENTOR
Eustachius W. Koering.
BY
M. J. Reynolds
ATTORNEY Patented Aug. 19, 1930

1,773,586

UNITED STATES PATENT OFFICE

EUSTACHIUS W. KOERING, OF VINELAND, NEW JERSEY

VITREOUS TOWEL BAR

Application filed November 2, 1927. Serial No. 230,585.

This invention relates to a towel bar or similar article composed of glass or other vitreous material and to means for securing the same to a wall or other surface.

In copending applications, Serial Nos. 754,705 and 119,292, filed December 9, 1924, and June 29, 1926, respectively, which matured into Patents Nos. 1,721,305 and 1,721,306, respectively, on July 6, 1929, I have disclosed a novel towel bar composed of glass, porcelain or similar material which is non-corrodible and readily cleaned. Briefly, such bar consists of a straight medial portion having the ends bent inwardly to offset the bar from the wall, each of the inwardly turned ends being supported by a metal bracket secured to the wall. The bar is secured in the bracket by a spring retaining member provided in the base of the bracket in engagement with a recess in the end of the bar to hold the bar rigidly in the bracket.

The present invention is concerned with an improvement on said bar, one of the objects being to provide a novel means of removably supporting the bar directly in the bracket.

A further object is to provide a vitreous bar having integral end portions and supporting brackets, all of said parts being composed entirely of glass or other vitreous material and having no exposed metal parts.

A further object is to provide a simple and effective means for securing a glass or vitreous bar to a wall or other surface.

Other objects and advantages will hereinafter appear.

In accordance with my present invention I employ a bar of glass or other vitreous material having its ends bent inwardly and secured in brackets or receptacles, adapted to be secured to the wall or supporting surface. The bar and the brackets are provided with interengaging members adapted, upon a slight rotation of the bracket relative to the bar, to lock the bar securely therein. The brackets are preferably composed entirely of glass, porcelain or other vitreous material.

In order that the invention may be more fully understood, reference will be had to the accompanying drawing in which:

Fig. 1 is an elevation partly in section of a towel bar and bracket, embodying my invention, applied to a wall;

Fig. 2 is a perspective view of one end of the glass bar;

Fig. 3 is a plan view of the bracket shown in Fig. 1;

Fig. 4 is a sectional view of a modified form of bracket;

Fig. 5 is a sectional view of a still further modified form of bracket; and,

Fig. 6 is a view on the line VI—VI of Fig. 5.

In Figure 1 I have shown a towel bar 1 of glass having inwardly turned ends 2 and 3 engaging in and supported from a wall 4 by a pair of spaced brackets 5 and 6. Each of the brackets 5 and 6 is preferably composed of glass or other similar vitreous material, although if desired, metal may be employed. A central socket 7 is provided in each of the brackets in which the ends 2 and 3 of the bar are secured. On opposite sides of the interior wall of the recess or socket 7 a number of undulations or ridges 8, forming portions of a screw thread, are formed. Each of said series of undulations extends throughout slightly less than a quarter of the circumference of the socket. A similar set of ridges or portions of screw threads 9 are provided on opposite sides of each end of the bar 1.

The brackets may be secured to the wall in any suitable manner, which will permit of limited rotation of the bracket relative to the wall. One convenient way of securing the bracket to the wall is shown in Figures 1 and 3, namely by means of a single screw 10 disposed centrally of the base portion 11 of the bracket.

In applying the towel bar to a wall, the brackets 5 and 6 are first secured to the wall by the screws 10 in such manner as to firmly hold the bracket to the wall but permitting the same to be rotated about the screw when sufficient force is applied thereto. The screw 10 should be sufficiently tight to prevent accidental movement of the bracket, however. After the brackets have been suitably secured to the wall the ends of the bar are inserted therein, with the threads on the bar disposed in the space between the oppositely arranged series of threads on the bracket. The brackets are then given one quarter turn to bring the threads therein into engagement with those on the bar, to firmly secure the bar therein.

As will be readily apparent, the bar may be removed for cleaning by slight rotation of the bracket in the reverse direction.

In Figure 4, I have shown the bracket provided with a metal thimble 12 for protecting the glass from being chopped or cracked by the screw and to assist in rendering the bracket plumb with the wall.

In Figures 5 and 6 I have shown a modification in which the bracket is secured to the wall by a pair of screws 13, the base of the bracket being provided with arcuate slots 14 to permit a quarter turn of the bracket relative thereto.

It will be noted that a towel bar and rigid support therefor has been provided which is composed entirely of glass or other vitreous and readily cleaned, non-corrodible and non-metallic material and which permits the bar to be readily removed from its supports and to be replaced therein.

Obviously, various changes and modifications may be made on the embodiment described without departing from the invention and I do not desire to be limited to the exact details shown and described.

What is claimed is:

1. A towel bar and support therefor comprising a bar of vitreous material having one end thereof circular in cross section and provided with screw threads extending throughout a portion only of the circumference of the bar, a receptacle having a recess therein, means within said recess for securing said receptacle to a wall, said recess being provided with screw threads throughout a portion of its circumference, the circumferential extent of the threaded portion of one of said members being not greater than the clear portion of the other member and said receptable having rotative movement relative to the wall, to enable the bar and receptacle to be secured together.

2. A towel bar and support therefor comprising a bar of vitreous material having one end thereof tapered and of circular cross section and provided with screw threads extending throughout a portion only of the circumference of the bar, a receptacle adapted to be secured to a wall in rotative relationship, said receptacle having a tapered recess therein provided with screw threads throughout a portion of its circumference, the circumferential extent of the threaded portion of one of said members being not greater than the clear portion of the other member whereby the end of said bar may be locked in said receptacle by rotative movement thereof relative to the end of said bar.

3. A towel bar and support comprising a bar of vitreous material having an end portion of circular cross section and having screw threads extending over a segment thereof, a vitreous receptacle having a recess therein, means within said recess for attaching said receptacle to a wall and permitting rotative movement thereof, relative to said wall and means within said recess for engaging said threaded portion of the bar upon rotation of the receptacle with respect thereto.

4. A towel bar and support comprising a bar of vitreous material, a receptacle of vitreous material having a recess therein, means within said recess for securing said receptacle to a wall or other surface, and cooperating segmental threaded portions on the end of said bar and in said recess for securing the bar within said receptacle by rotative movement of said receptacle.

5. A towel bar and support therefor, comprising a bar of vitreous material, a receptacle of vitreous material, a recess in said receptacle for the reception of an end of said bar, means on said bar cooperating with means in said recess for detachably securing said bar in the receptacle by rotative movement, apertures through the base of said recess adapted to receive means for securing said receptacle to a wall and permitting rotative movement thereof relative to said wall.

6. A towel bar and support therefor, comprising a bar of vitreous material, a receptacle of vitreous material, a recess in said receptacle for the reception of an end of said bar, a plurality of threaded segments on said bar, cooperating threaded segments in said recess, said threaded segments being separated by clear segments equal to or greater in circumferential extent than said threaded portions whereby the bar may be secured in the receptacle by limited rotation thereof, apertures through the base of said recess adapted to receive means for securing said receptacle to a wall and permitting rotative movement thereof relative to said wall.

7. A towel bar and support therefor, comprising a bar of vitreous material, a receptacle of vitreous material, a recess in said receptacle for the reception of an end of said bar, means on said bar cooperating with means in said recess for detachably securing said bar in the receptacle by rotative movement, arcuate apertures through the base of said recess adapted to receive means for securing said receptacle to a wall and permitting rotative movement thereof relative to said wall.

8. A towel bar and support therefor, comprising a bar of vitreous material, a receptacle of vitreous material, a recess in said receptacle for the reception of an end of said bar, a plurality of threaded segments on said bar, cooperating threaded segments in said recess, said threaded segments being separated by clear segments equal to or greater in circumferential extent than said threaded portions whereby the bar may be secured in the receptacle by limited rotation thereof, arcuate apertures through the base of said recess adapted to receive means for securing said receptacle to a wall and permitting rotative movement thereof.

In testimony whereof, I have hereunto subscribed my name this 28th day or October, 1927.

EUSTACHIUS W. KOERING.